United States Patent [19]

Oliver

[11] Patent Number: 4,540,849
[45] Date of Patent: Sep. 10, 1985

[54] METER INTERFACE UNIT FOR UTILITY METER READING SYSTEM

[75] Inventor: Stewart W. Oliver, Venice, Calif.

[73] Assignee: International Teldata II Corp., Los Angeles, Calif.

[21] Appl. No.: 502,201

[22] Filed: Jun. 8, 1983

[51] Int. Cl.³ .......................................... H04M 11/00
[52] U.S. Cl. ................................................ 179/2 AM
[58] Field of Search ................ 179/2 AM, 2 A, 2 C, 179/2 BC, 5 R, 5 P, 2 DP

[56] References Cited

U.S. PATENT DOCUMENTS

| | | | |
|---|---|---|---|
| 3,742,142 | 6/1973 | Martin | 179/2 AM |
| 3,842,206 | 10/1974 | Barsellotti et al. | 179/2 AM |
| 3,868,640 | 2/1975 | Binnie et al. | 179/2 AM |
| 3,899,774 | 8/1975 | Binnie et al. | 179/2 AM X |
| 4,004,097 | 1/1977 | Spaulding | 179/2 AM |
| 4,059,727 | 11/1977 | Kingswell et al. | 179/2 AM |
| 4,151,371 | 4/1979 | Yoshihara et al. | 179/2 AM |
| 4,178,480 | 12/1979 | Carbrey | 179/2 DP X |

Primary Examiner—Gene Z. Rubinson
Assistant Examiner—W. J. Brady
Attorney, Agent, or Firm—John E. Wagner

[57] ABSTRACT

A meter interface unit for interconnecting utility meter reading apparatus to a telephone line to allow the automatic reading of utility usage at the telephone central office in response to an interrogation signal from the telephone central office. The meter interface unit converts meter reading signals to alternating signals for transmission to the telephone central office when a subscriber's telephone is on-hook. The unit also encodes a subscriber or customer identification signal which is transmitted with utility usage data to eliminate the need of any manual reading of the utility meter at the customer's premises. The meter interface unit is powered over the telephone line.

12 Claims, 12 Drawing Figures

METER INTERFACE UNIT FOR UTILITY METER READING SYSTEM

BACKGROUND OF THE INVENTION

The present invention relates to an apparatus and method of sending data over a telephone line and more particularly with sending utility usage information over a telephone line in response to receiving an interrogate signal from the telephone line.

The present invention is suited for sending utility usage data and can send utility usage information from virtually any utility monitoring device over a telephone line. The typical use of the present invention is in an automatic utility meter reading system in which the present invention is responsible for sending the utility usage information from at least one utility monitoring device over a telephone line in response to receiving an interrogate signal.

The automatic utility meter reading system for which the present invention is particularly suitable is described in co-pending application Ser. No. 543,372, filed Oct. 19, 1983 for a Centerpoint Automatic Meter Reading System. This meter reading system is generally located at a central telephone office where a multiplexor system, best described in co-pending application Ser. No. 544,110, filed Oct. 21, 1983 for A Multiplexor for An Automatic Utility Meter Reading System, sends a series of distinct interrogate signals over a plurality of telephone lines. Each of the telephone lines has connected to it at least one of the apparatus of the present invention. In response to receiving a particular distinct interrogate signal, each of the present apparatus then causes a utility monitoring device to deliver its utility usage information which is sent over the telephone line to the multiplexor. The multiplexor decodes and stores the received meter readings for subsequent retrieval and mass storage by a microcomputer. The apparatus of this invention may also be accessed from the telephone central office via the metallic test access port and the subscriber line by manual dialup of the subscriber number.

There have been systems for sending utility usage data over telephone lines. One such system can be found in U.S. Pat. No. Re. 26,311 to Dumont et al. This system uses the telephone companies leakage testing system to call up the individual meter installations. Once a meter installation is called up, it sends the meter information over the telephone line to a central telephone office. However, the Dumont invention requires the use of a telephone company's leakage testing system to be operable and such leakage testing system can change, requiring an additional large investment in new equipment configured to the new leakage testing system. As well, not all telephone companies have the same type of leakage testing equipment, so that numerous configurations of the meter reading system must be devised to fit the numerous types of leakage testing equipment.

The Dumont invention also requires a power supply, powered either from the power available at the meter installation site or from battery power, for each of its meter installations. Unlike the present invention, this requirement of a power supply makes the Dumont invention costly, more difficult to service, and makes the system prone to failures due to common power outages at the installation site.

Unlike the present invention, the Dumont invention requires a complex synchronous data output on the telephone line. The synchronous output requires that the meter installations send additional sync pulses over the telephone line. In the event that either the sync pulses or synchronous meter data is momentarily interrupted by even a short noise pulse, which is quite common on telephone lines, the meter data will be lost. In addition, lines must be read *sequentially* which greatly slows down the process.

Another system which has been used to send data over a telephone line is found in U.S. Pat. No. 3,922,490 to Pettis. The Pettis invention is a direct current system where several resistances are switched across tip and ring of the telephone line. The current drawn by the several different combinations of resistances connected to the telephone line are sensed at a central telephone office and any of several conditions are thus communicated. Typically, in the Pettis invention, the least significant digit pointer of a utility meter makes or breaks a switch depending on which half of its rotation the pointer is presently in. The making or breaking of the switch causes the resistance across the telephone line to change. This change is sensed at the central office and the cumulative count of changes in transition are totaled and the meter reading determined therefrom.

Of course, the Pettis invention, being a D.C. system, does not relate at all to the present invention which is an A.C. system for sending data over the telephone line. As well, the present invention sends an entire updated reading each time it is requested to do so; the Pettis invention requires that a first reading be known to the central telephone office and that all of the subsequent transitions of the least significant pointer be received without interruption for an accurate meter reading to be had. If there is any interruption in the receiving of the transitions greater than a typical transition period, the central office will have to send someone out to the installation site to read the proper meter reading to compensate for the lost transitions.

None of the above described inventions is responsive to alternating current interrogation signals, and none have a meter interface device which sends alternating current representations (while the telephone is ON-HOOK or OFF-HOOK) and is powered from the telephone line in either the ON-HOOK or OFF-HOOK state; and, powering a meter interface from the telephone line has some extremely important advantages which will be discussed later. As well, none of the above described inventions sends current utility usage information asynchronously over the telephone line.

SUMMARY OF THE INVENTION

The present invention is an apparatus and method for sending data over a telephone line. The apparatus is an interfacing device comprising a converting means coupled to at least one utility monitoring device and to the telephone line for converting utility information from at least one utility monitoring device into alternating current representations and for sending the alternating current representations over the telephone line; means coupled to the telephone line for detecting a preselected interrogation signal from the telephone line; and, means responsive to detection of the interrogation signal for enabling said converting means. Each of said means are powered by current on the telephone line.

The converting means may comprise a means coupled to each of the utility monitoring devices for sensing the utility usage information and providing a digitally encoded representation of the utility usage information from each of the utility monitoring devices; means for converting the digitally encoded representations of the utility usage information from each of the utility monitoring devices into the alternating current representations; and, means for sending the alternating current representations over the telephone line. The enabling means may comprise means for producing a monitor signal responsive to the detection of the interrogation signal and means for enabling the means for sensing the utility usage information responsive to the monitor signal. The apparatus may include means for encoding and transmitting a customer identifier signal.

The means for powering the interfacing device from the telephone line may include a means for producing an inoperative condition in the device when the telephone line is in an OFF-HOOK condition unless the interfacing device itself causes the OFF-HOOK state. Powering the interface device from the telephone line has several advantages. First, the interface device does not have to be installed within a building where it is located. This advantage allows for easy installation and servicing. Second, the interface device is not dependent on power from the installation site. This advantage decreases dramatically the incidence of interruption in meter reading caused by power outages. The telephone company's power systems are backed up by their own batteries and generators so that a power outage from the telephone line is much less likely than a power outage from an electrical utility company.

Third, the cost of the interface device is decreased and fewer components are required to comprise a meter interface device. The lower cost is important since there may be hundreds of thousands of the interface devices in each community used in conjunction with an automatic utility meter reading system. The fewer components required to perform the task of sending the data over the telephone line generally means that there is a lower probability of component failure compared to a system with more components.

Fourth, the feature of being un-powered during subscriber generated OFF-HOOK conditions is that, even though the device may have circuitry hard wired to the telephone line which would slightly attenuate audio signals when active, there is virtually no load (AC or DC) presented to the phone line during OFF-HOOK conditions. This is a very important characteristic since all normal telephone data or voice communications occur OFF-HOOK. Thus, the device is transparent in OFF-HOOK conditions and yet needs no relays or switching of any kind to isolate the interface device's transmitting output stage which adds complexity and cost.

The alternating current representations may be in the form of a series of pulses of a pulse width modulated single carrier frequency or frequency shift keying signals, each carrying representations of a utility usage figure and a meter identification figure.

The interrogate signal is typically a single or multi-frequency distinct tone burst when the interface device is used in conjunction with an automatic utility meter reading system. The interrogate tone commands the interface device to send data from a utility monitoring device over the telephone line. The data is typically sent as a pulse width modulated carrier tone when the interface device is reading the typical water meter. Thus, in the case of the typical water meter, the usage data from the water meter is sent over the telephone line as a series of tone bursts representing digital signals. The data sent may also be a series of dual-tones, each tone pair indicating a single digit from the utility monitoring device.

The data sent by the interface device from the typical water meter can be received in a central telephone office and the usage data from a number of interface devices can be compiled.

The present invention is also a method of sending data over a telephone line comprising the steps of receiving a particular distinct interrogatory signal from the telephone line; producing a monitor signal in response to receiving the particular distinct interrogation signal from the telephone line; sensing data from at least one data monitoring source in response to the monitor signal; converting the sensed data into alternating current representations; and, sending the alternating current representations over the telephone line.

The method of the present invention may also include the step of preventing the sending of the alternating current representations when the telephone line is in an OFF-HOOK condition. The interface device may retain the ability to transmit while in an OFF-HOOK state when the type of telephone equipment used requires it. The interface device may contain the ability to initiate an OFF-HOOK state upon command to do so as to activate the return communication link in some types of commonly used telephone equipment.

Interrogation from the telephone central office may be via the test port by dial-up procedures usually used for line testing. This eliminates the need for much of the special interrogation equipment.

DETAILED DESCRIPTION OF THE INVENTION

Figure 1:
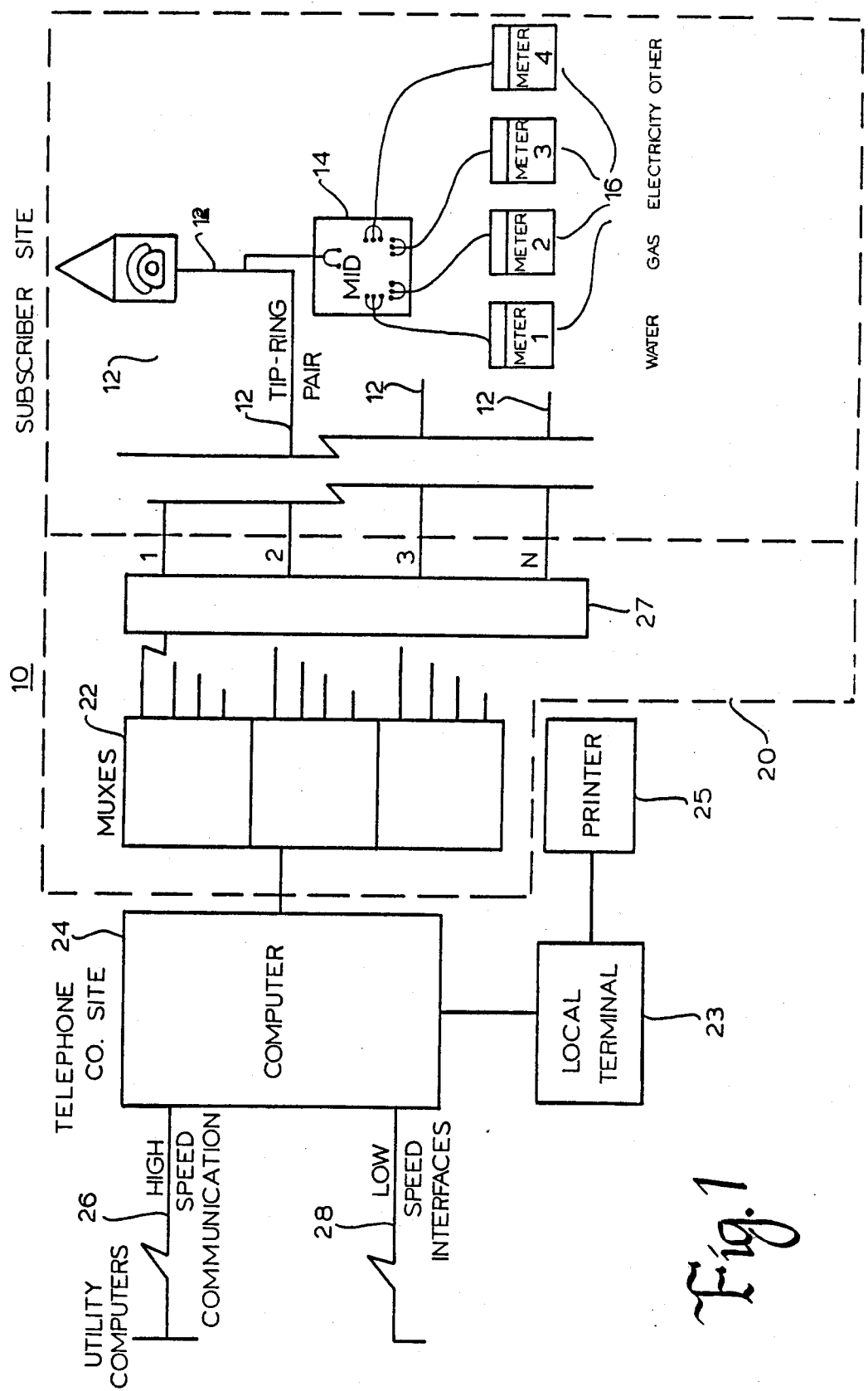
FIG. 1 is an electrical block diagram of the automatic utility meter reading system for which the present invention is particularly suited.

Referring to FIG. 1, the applicant's invention is an interfacing device for sending data from a monitoring device over a telephone line. The interfacing device of the applicant's invention is particularly suited to be a meter interface device for an automatic utility meter reading system 10, similar to one described in co-pending application Ser. No. 543,372, filed Oct. 19, 1983, for Centerpoint Automatic Meter Reading System. In the utility meter reading system 10, a plurality of subscriber's telephone lines 12 are connected to at least one meter interface device 14 of this invention. The meter interface device (MID) 14 of the applicant's invention may have one or several utility monitoring devices (UMD's) 16 which can send a usage figure to the meter interface device 14 upon receiving a command therefrom. The MID 14 of the applicant's invention in combination with at least one UMD 16 typically comprises an installation of the utility meter reading system 10 at the subscriber's site. A typical utility monitoring device (UMD) 16 for monitoring water usage can be seen in U.S. Pat. No. 4,085,287 to Kullman et al, the disclosure of which is incorporated by reference herein.

The MID's 14 connected to the individual subscriber's telephone lines 12 are each sensitive to receiving a particular distinct interrogation signal from a telephone central office via the metallic test access port normally used for testing lines or preferably via a multiplexer system 20, similar to one described in co-pending application, Ser. No. 544,440, filed Oct. 21, 1983 for A Multiplexing System for an Automatic Meter Reading System. When a particular interrogation signal is received over a subscriber's line 12 by the MID 14, the MID 14 commands a usage figure from one of its UMD's 16 which is then sent over the subscriber's line 12. It can be seen that numerous meter readings can be sent over a plurality of telephone lines in the utility meter reading system 10.

The plurality of subscriber's lines 12 are typically connected to central office 27 and are multiplexed both for the sending of the plurality of interrogation signals and for the receiving of the plurality of meter readings in the mulitplexor (MUX) stage 22 of the typical multiplexing system 20. The meter reading data is sent to a computer 24 which can assemble and compile the plurality of usage figures into billing information. The computer 24 may be accessed by local terminal 23 and printer 25. Since the multiplexing system 20 is typically in a central telephone office, the billing information or the meter readings alone may be sent to a utility company by high or low speed data lines 26 and 28.

PREFERRED EMBODIMENTS

A One UMD Embodiment

Figure 2:
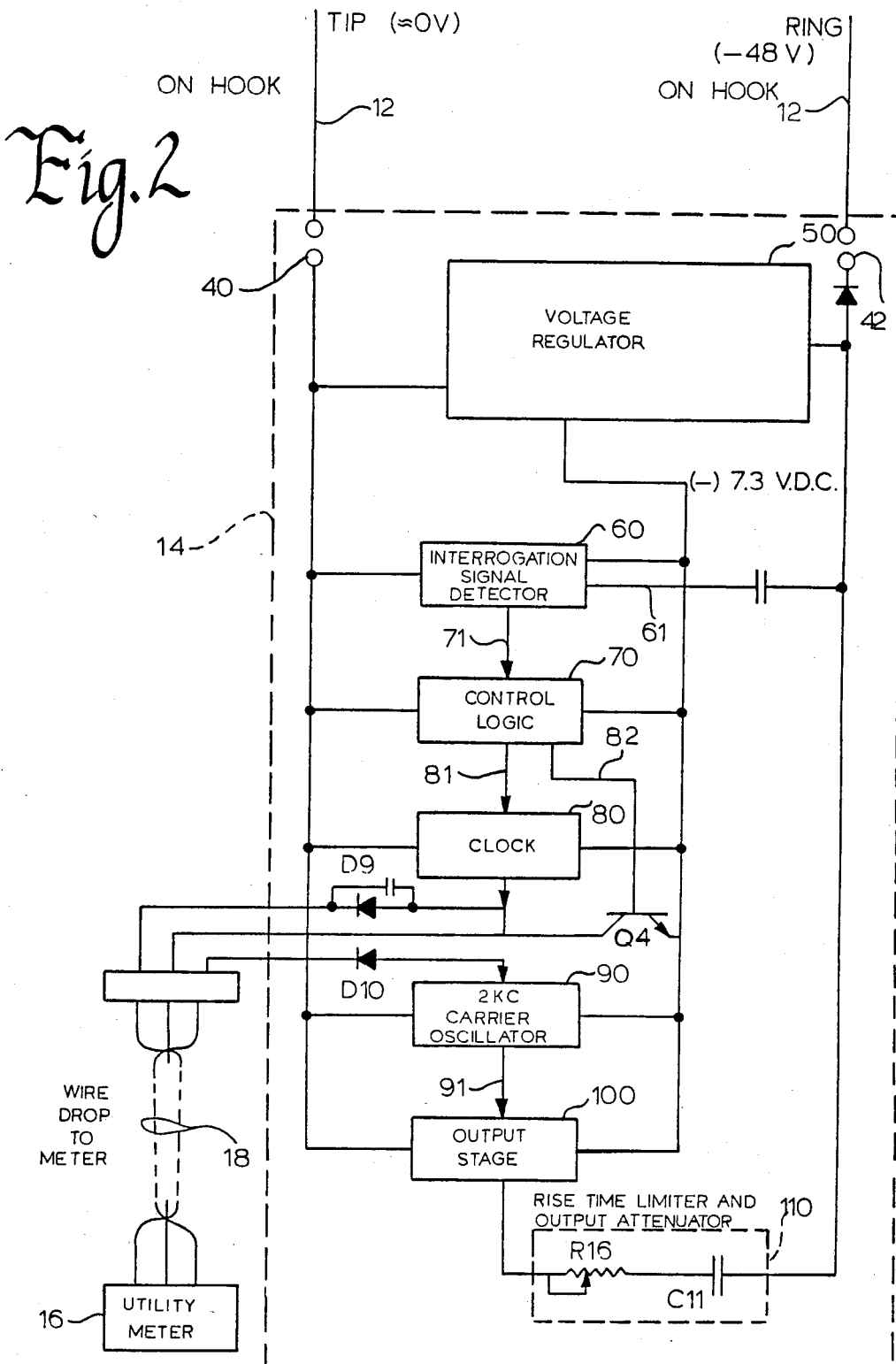
FIG. 2 is an electrical block diagram of a single monitoring device embodiment of the present invention.

The applicant's invention relates to a meter interface device (MID) 14 for sending utility usage information over a telephone line, and, referring to FIG. 2, a one monitoring device embodiment of the MID 14 of the applicant's invention is seen. The tip 40 and ring 42 connectors are connected to the subscriber's telephone line 12 which has approximately −48 volts on the ring conductor with respect to the tip conductor in an ON-HOOK condition. The TIP conductor of a typical telephone line usually sits at approximately earth ground potential. In the preferred embodiments of the applicant's invention, the MID 14 is powered from the telephone line 12. This feature has the obvious advantage of doing away with separate power supplies which must be powered from the subscriber's location or battery supplies. Also, this feature allows the MID 14 to be completely shut off when the telephone line 12 becomes OFF-HOOK, if this feature is desired. This will guarantee non-interference with normal communications.

A voltage regulator 50 drops the 48 volt ON-HOOK telephone line 12 supply voltages to a range compatable with digital logic integrated circuits. The MID 14 can prevent its own operation when the telephone line 12 is OFF-HOOK by requiring that the input voltage to the MID 14 be higher than a voltage appearing on the OFF-HOOK telephone line 12, typically 2.5 to 8 volts on most telephone lines. The voltage regulator 50 is responsible for furnishing power to an interrogation signal detector 60, a control logic circuit 70, a clock circuit 80, a carrier oscillator circuit 90 and an output circuit 100 which comprise the operational elements of the MID device 14.

When a particular distinct interrogation signal, to which the MID 14 has been designed to respond, is sent over the telephone line 12, the interrogation signal detector 60 responds by sending a signal indicating the presence of the interrogation signal to the control logic circuit 70. The control logic circuit 70 responds by turning on the clock circuit 80, powering the output stage 100 and powering the UMD 16 through transistor Q4.

Figure 4:
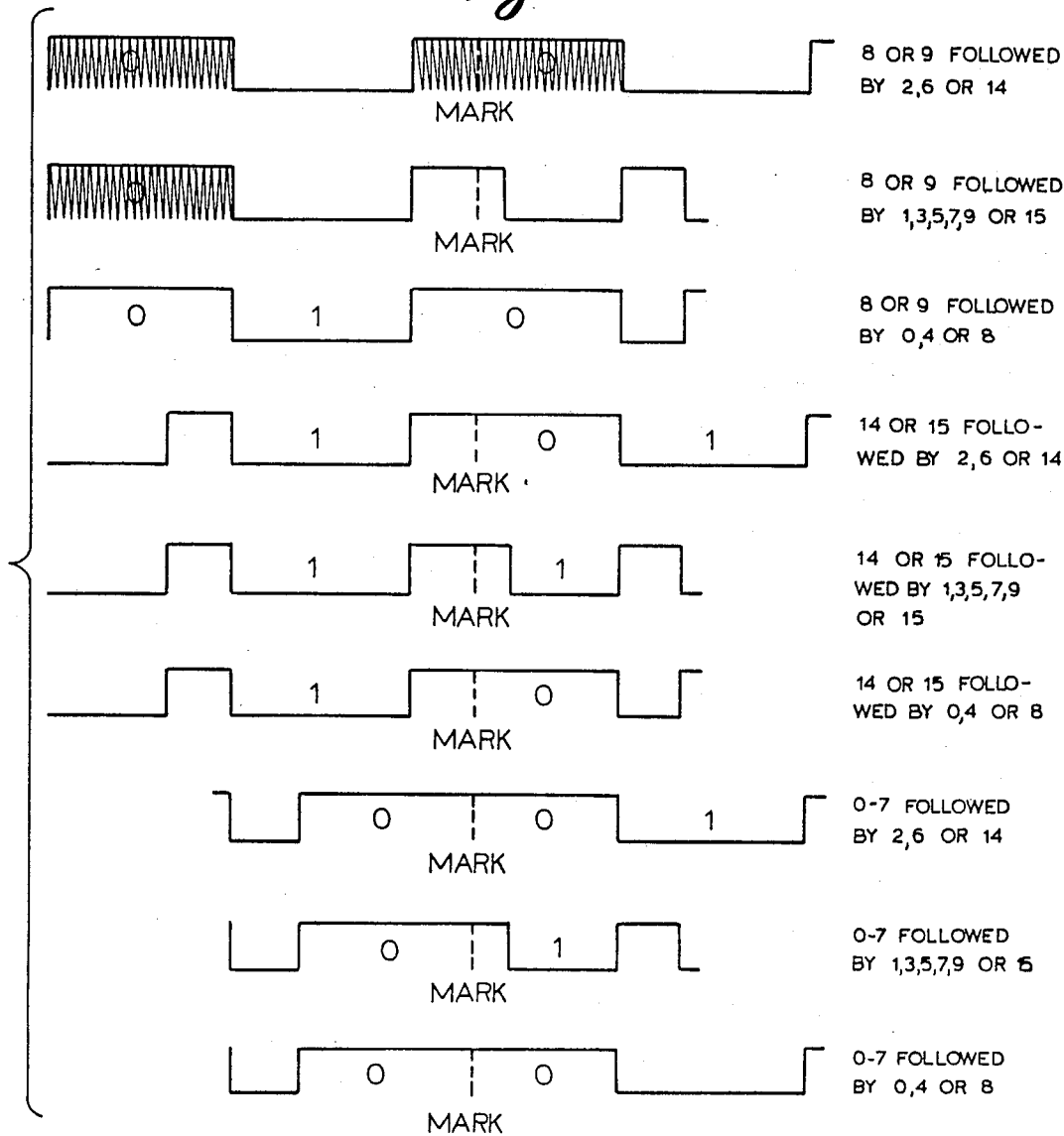
FIG. 4 is a graphical representation of the waveforms generated by the interfacing device when it is sending usage data from a water meter.

It will be seen that this embodiment of the applicant's invention is particularly suited to send utility information from the water meter encoder described in U.S. Pat. No. 4,085,287 to Kullman et al. Suffice it to say that the Kullman water meter encoder comprises four rotary switches represented in simplified for in FIG. 4, which turn as the water is consumed. The positions of these four rotary switches indicate the water usage figure. The rotary swithes are digitally scanned to output a series of pulse width modulated digital signals representing the usage figure from the rotary switches together with sentinel figures. Typical pulses from the Kullman water meter meter can be seen in FIG. 4a. However, for reasons discussed in the section dealing with interfacing the Kullman water meter encoder to the MID 14, the typical pulses represented in FIG. 4a will not be those outputted from the Kullman water meter encoder when it is interfaced to the preferred embodiment of the invention.

The clock circuit 80 of the MID device 14 sets up the timing of the pulse train which will be outputted from the water meter UMD 16 of the preferred embodiment. The pulses from the Kullman water meter in the preferred embodiment are graphically depicted in FIG. 4. These pulses seen in FIG. 4 pulse the carrier oscillator circuit 90 directly, thus, the carrier from the carrier oscillator circuit 90 is turned on for the duration of the positive going pulses and shut off during the zero voltage transitions. This pulsed carrier is conducted onto the telephone line 12 through the output circuit 100 which amplifies the pulsed carrier and rise time limiter circuit 110 which limits components of the typical 2000 Hertz carrier frequency appearing above 3000 Hertz in frequency.

Figure 3:
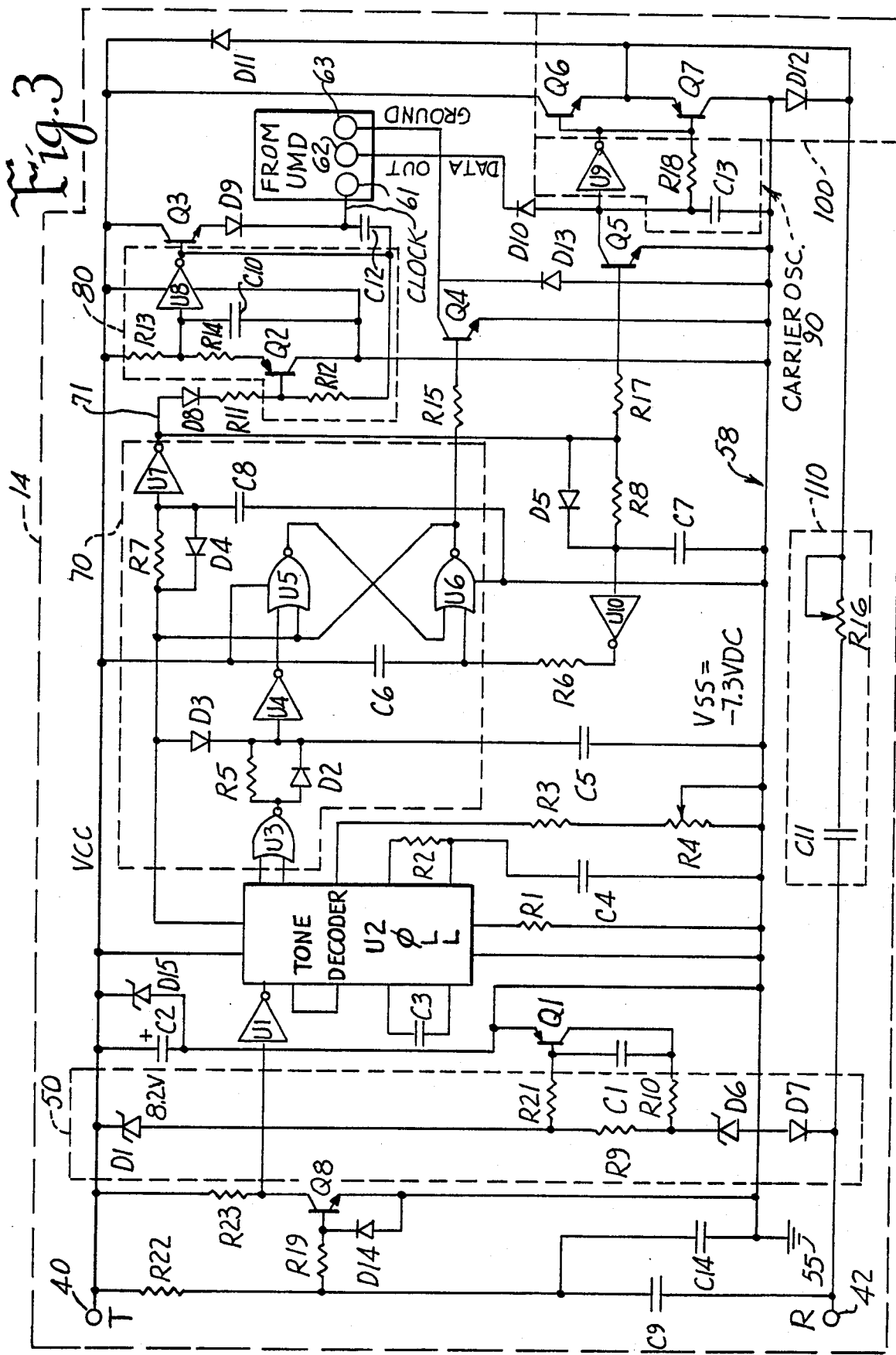
FIG. 3 is an electrical schematic diagram of the single monitoring device embodiment of the present invention.

Referring now to FIG. 3, the one monitoring device embodiment of the MID 14 of the applicant's invention is seen in greater detail. The voltage regulator 50 consists of Zener diodes D1 and D6 and diode D7 which with transistor Q1 prevents conduction in a reverse direction, thus, enabling the telephone company to still make accurate line leakage tests by testing the line with a reverse battery applied (RING +, TIP −). Diode D7 prevents a reverse current from being conducted through the MID 14 whether such reverse current is created by telephone company leakage tests or incorrect installation of the tip 40 and ring 42 connectors to the telephone line 12. The power supply 50 with its internal ground 55 is referenced to the tip side of the line 12.

The feature of automatically shutting off the MID 14 when the telephone line 12 is in the OFF-HOOK position is included in the diagram of FIG. 3. Typical value of zener diode D1 is 8.2 volts and the typical value of zener diode D6 is 16 volts. Therefore, it can be seen that the voltage between tip 40 and ring 42 must be somewhere over 24 volts to cause D1, D6 and D7 to allow current to allow voltage to be conducted to power line 58; since the typical OFF-HOOK voltage is between 8 and 2.5 volts, it can be seen that the MID 14 will be inoperative at typical OFF-HOOK voltages insuring non-activation during a telephone conversation and also increasing the impedance the MID impresses on the line to insure no attenuation or distortion of OFF-HOOK voice or data signals. It can also be seen that at a typical ON-HOOK voltage which is 48 volts, the voltage on power line 58 is typically −7.3 volts DC. The MID 14 is referenced to TIP with a resultant negative supply voltage used because with TIP close to ground potential, less current will be conducted to ground from the telephone line in the event of a meter, meter drop, or MID malfunction causing leakage to ground. (The UMD's 16 drop wire can leak to ground if damaged).

If the MID 14 of FIG. 3 develops a short circuit either at the UMD input lines 61, 62 and 63 or in other components of the MID 14, the telephone line 12 will see only the value of resistances R9 and R10 across its tip and ring connections. The line sees 5,000 ohms across its tip and ring conductors. Therefore, the telephone line 12 is protected from short circuits which may develop in the MID 14 or the UMD 16 so that the telephone service will not be interrupted.

UMD Isolation

The MID of this invention has been designed to minimize leakage current between the telephone line and ground which could result from a deteriorating in-ground cable which connects the MID to the UMD. This is particularly important in the case of the UMD being connected to a water meter since the UMD may be itself submerged in ground potential water in some areas at some times of the year.

These potential leakage currents are minimized by referencing the voltage regulator 50 output and therefore all of the MID's circuitry to the TIP side of the line which normally is at near ground potential. In addition, a UMD isolation circuit is provided which allows the UMD to "float" in potential relative to the MID during idle and OFF-HOOK conditions. Referring specifically to FIG. 3, the UMD isolation circuit comprises transistors Q3 and Q4, diodes 9 and 10 and capacitor 12.

Operation

In operation, the received interrogation signal in the form of an AC tone burst from the telephone central office is amplified by transistor Q8 and associated components and then put through a Schmitt trigger inverter integrated circuit U1 connected to a phase lock loop integrated circuit U2. The phase lock loop U2 is set up to respond to a single tone interrogation signal. When the single tone interrogation signal is detected, NOR gate U3, inverter U4, NOR gates U5 and U6, and inverter U7, which typically comprise the control logic circuit 70, turn on the clock circuit 80. The frequency of the UMD clock carrier oscillator circuit 90 is determined by the values of resistor R13 and capacitor C10 which are connected to the input of an inverter U8.

The control logic circuit 70 also turns on the carrier oscillator circuit 90. The frequency is determined by R18 and C13 which drives into complimentary emitter follower amplifier output stage 100 which sends the pulsed carrier to the rise time limiter circuit 110 which typically consists of capacitor C11 and potientiometer R16 or, alternatively, an operational amplifier (not shown) with line AC feedback to enable auto-adjust of the output level. One purpose of the rise time limiter circuit 110 is to limit the rise times of the carrier pulses to 0.167 milliseconds maximum to prevent frequency components above 3 kilohertz from being produced when the carrier has the typical frequency of 2 kilohertz. However, it must be noted that frequencies from about 300 to about 3500 Hertz may be used as a carrier frequency and still be consistent with the applicant's invention.

It must be noted that it is totally consistent with the applicant's invention to send utility information from virtually any utility meter, such as water meters, watt-hour meters and gas meters, by interfacing the MID 14 with each of such utility meters. As well, numerous data transmission schemes may be used in creating the alternating current representations of the usage information from a UMD 16. Furthermore, the applicant's invention may be configured to respond to numerous types of interrogation signals sent over the telephone line 12. The single tone concept is far the simplest and yet effective.

Interfacing to a Water Meter

As previously discussed, the one monitoring device embodiment of the MID 14 of the applicant's invention is particularly suited to send utility information from a water meter encoder of the type described in U.S. Pat. No. 4,085,287 to Kullman et al. This Kullman water meter UMD 16 of FIG. 2 requires a clock input line 61, data output line 62 and a ground line 63. The clock input line 61 (22 in FIG. 5 of U.S. Pat. No. 4,085,287) powers the Kullman water meter encoder through a diode (25) and capacitor (26) to ground. With the typical 10 kilohertz, 50% duty cycle clock input, the rectification from the diode and filtering by the capacitor provide an adequate, stable input voltage. However, as will be discussed, it is advantageous to reduce the clock frequency to about 200 Hertz to get the optimum characteristics of the pulse width modulated carrier for transmission on the telephone line 12. This reduced frequency clock will not allow proper powering of the Kullman water meter UMD 16 at a 50% duty cycle. This 50% duty cycle at a frequency of 200 Hertz will produce significant sags in the voltage resulting on the voltage input line (27 on FIG. 5 of U.S. Pat. No. 4,085,287). If the Kullman water meter is leaking current to earth ground by becoming immersed in water, the current requirements are heightened and the sags become even more significant. The current sags will cause the Kullman water meter UMD 16 to operate improperly. Therefore, at the reduced frequency clock of 200 Hertz, the clock pulses must have a higher duty cycle which is typically 99 percent.

A clock pulse frequency of 200 Hertz with a 99% duty cycle on the positive going pulse has been found to be the preferred characteristics of the clock pulse input.

Figure 4A:
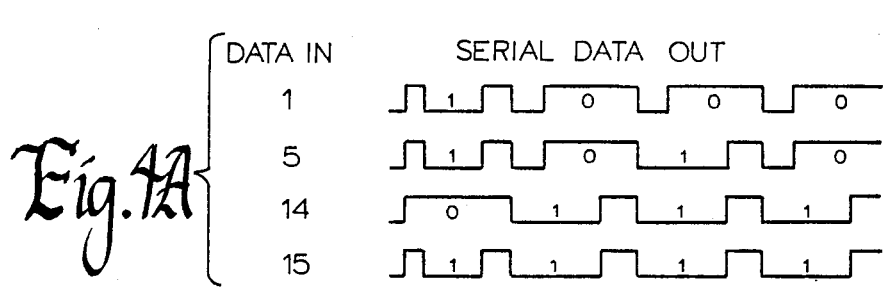
FIG. 4A is a graphical representation of the waveforms generated by the Kullman water meter under the conditions described in U.S. Pat. No. 4,085,287.

However, increasing the duty cycle of the clock input pulse has the adverse effect of overriding the mark pulse seen in each pulse train example in FIG. 4a (also shown as 88 of FIG. 8 of U.S. Pat. No. 4,085,287) which is a negative going pulse at the start of each digit of data. This is caused because the mark pulse, in the Kullman water meter encoder is proportional in width to the negative going period of the clock pulses. However, this overriding effect does not make it impossible to recover the data from the Kullman water meter UMD 16. The relative pulse widths of the data from the Kullman water meter UMD 16 can be sensed at the multiplexors 22 of FIG. 1 and the data can be determined from the relative pulse widths of the data pulse train received.

Referring to FIG. 4a, mid-regions of several typical output data pulse trains are shown. An 0 bit followed by an 0 bit has the largest bit period. An 0 bit followed by a mark bit has the next highest bit period and so forth. As can be seen, the mark bit is too short to be detectable and is represented by a thin line where the mark bit should have been. However, the Kullman water meter UMD 16 sends out a series of BCD 14's (see FIG. 18 of U.S. Pat. No. 4,085,287) which can be used to set the relative bit periods and relative 4 bit character periods which comprise a single digit of the meter reading. The multiplexor 22 as disclosed in our above referenced co-pending application, looks for the series of BCD 14's in the data received and sets the bit period and 4 bit character period for which the rest of the data digits will be compared to detect the Kullman water meter reading. The relative pulse durations in each character period are then compared to all possible combinations of relative pulse durations for the characters of the meter reading and a meter identification figure.

This feature of comparing the relative pulse durations in each character period of the pulse train also allows for the pulse widths of the pulse train from the MID 14 to drift over large ranges and still be able to send accurate meter readings over the telephone line 12. This is because the relative pulse widths are first stored and then compared at the multiplexor 22 of FIG. 1; so long as the pulse width relativity is intact, the meter readings can be received and decoded by the multiplexor 22. Since the relative pulse widths may vary, there is no need for expensive time bases, thus, the cost of each of the MID 14s is greatly reduced. Also, since the relative pulse widths are first stored, there is no time limitation on the subsequent task of decoding. In central office computer software, this time advantage enables use of quite sophisticated techniques enabling the reconstruction of a very marginal reading.

Suffice it to say, the outputted data pulse train on the data output line from the Kullman type meter encoder 62 turns on the carrier oscillator 90 of FIG. 3 with every low to high transition of the outputted data pulse train and turns it off with every high to low transition of the outputted data pulse train. Therefore, the typical output of the carrier oscillator 80 is a series of asynchronous pulses of a single carrier tone with the pulses having several pulse widths. However, it must be noted that there are different ways of sending the utility information over the telephone line 12 suitable for a different type of UMD 16 which may be used and still be consistent with the applicant's invention.

The data pulse train is sent over the telephone line 12 for typically one and one-half times the time necessary to send a single meter reading so that no data bits can be lost if the sending starts somewhere after its beginning point. This one and one-half time period constitutes a wrap around of the data bits from the Kullman water meter UMD 16.

The frequency found to be the most preferred for the carrier frequency of the MID 14 of the applicant's invention is about 2 kilohertz, and, the preferred duration of the average pulse width of the 2 kilohertz carrier has been found to be about 10 cycles or about 5 milliseconds when the Kullman water meter UMD 16 is used to monitor the water usage information. A 2 kilohertz frequency was chosen because it is in the mid-range of the human voice which telephone lines 12 are made to carry. Being in the mid-range of the human voice allows the carrier to be transmitted over any direct wire or carrier-derived telephone lines 12. As well, the 2 kilohertz frequency is not in conflict with any known frequency used by telephone companies for testing purposes, therefore, this frequency will not interfere with existing telephone operations.

The average pulse width of the 2 kilohertz carrier was chosen by considering that an increased pulse width will give a greater amount of reliability to the receiving of the pulse train on the opposite side of the telephone line 12 by increasing its immunity to noise pulses. At the same time, the shorter the time required to send a Kullman water meter reading the better since there may be numerous such MID's 14 to be read. The preferred compromise between the two considerations has been found to be the 5 millisecond average pulse width. It must be noted that since the pulse widths vary from the Kullman water meter UMD 16, it is the average of these pulse widths which is 5 milliseconds.

The pulse width modulated carrier from the carrier oscillator has the advantage of drawing a significantly lower average current than other modulations, such as frequency shift keying, where the carrier is always on. With a lower average current draw, the MID 14 can be powered from the telephone line 12 and not have an OFF-HOOK condition occur because the MID 14 is drawing excessive current during transmission of data. In addition, a higher carrier signal level can be used since FCC signal power regulations restrict levels on a 3 second average. This is the reason why pulse width modulation was chosen; however, it is important to note that other modulation methods may be used to transmit utility information from an UMD 16 and still be consistent with the applicant's invention.

Figure 5A:
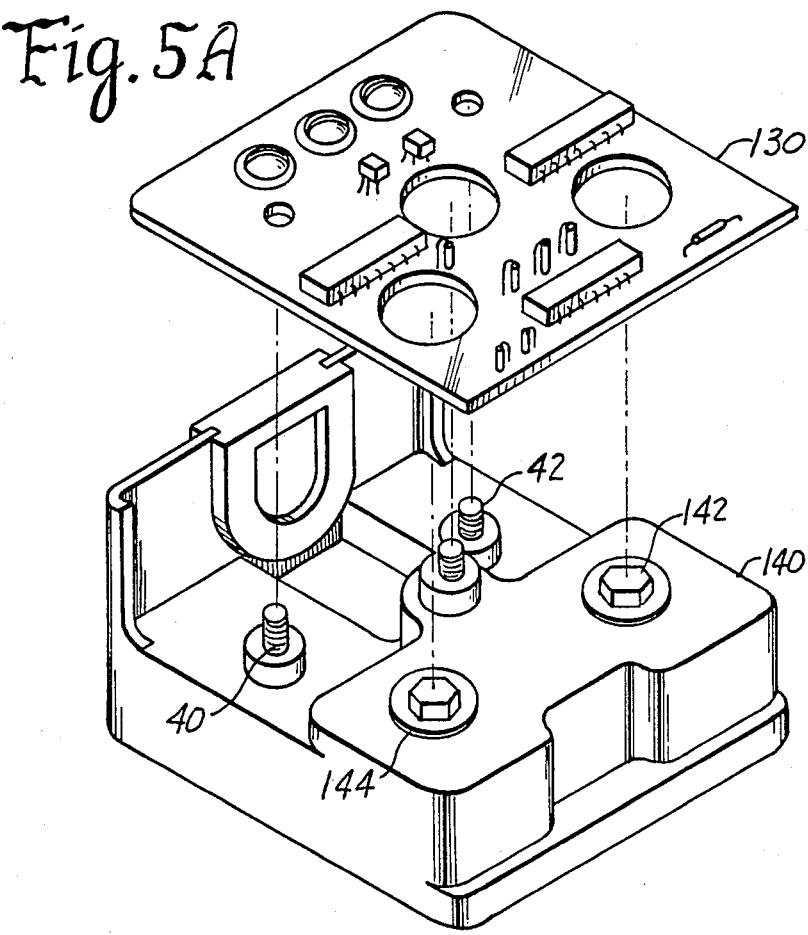
FIG. 5A is an exploded view of the printed circuit board of the present invention and the telephone line protector block in which the printed circuit board is mounted.
Figure 5B:
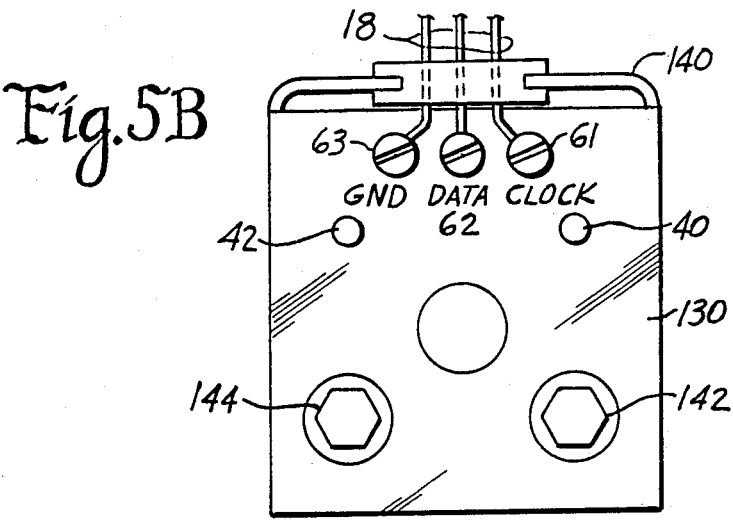
FIG. 5B is an top view of the printed circuit board of the present invention mounted within the telephone line protector block.

Referring to FIG. 5A and 5B, the components of the one monitoring device embodiment of the MID 14 are typically mounted on a printed circuit board 130. This printed circuit board 130 can be configured to fit over the tip and ring 40 and 42 (FIG. 5a) connectors of a common telephone line protector block 140. This line protector block 140 typically houses lightning protectors 142 and 144 which protect telephone equipment from lightning induced overvoltage conditions. The entire one monitoring device embodiment of the MID 14 on the printed circuit board 130 may be housed inside the line protector block 140 housing (unshown).

The mounting of the printed circuit board 130 in the line protector block 140 allows for easy installation of the MID 14 at a subscriber's site. There will be no necessity to go into a subscriber's building to install or service the MID 14. The wire drop 18 from connections 61, 62 and 63 may be run to a UMD 16 at the subscriber's site. As previously stated, the UMD 16 may be virtually any type of monitoring device since the MID 14 can be interfaced to vitually any type of UMD 16.

Four UMD Embodiment

Figure 6:
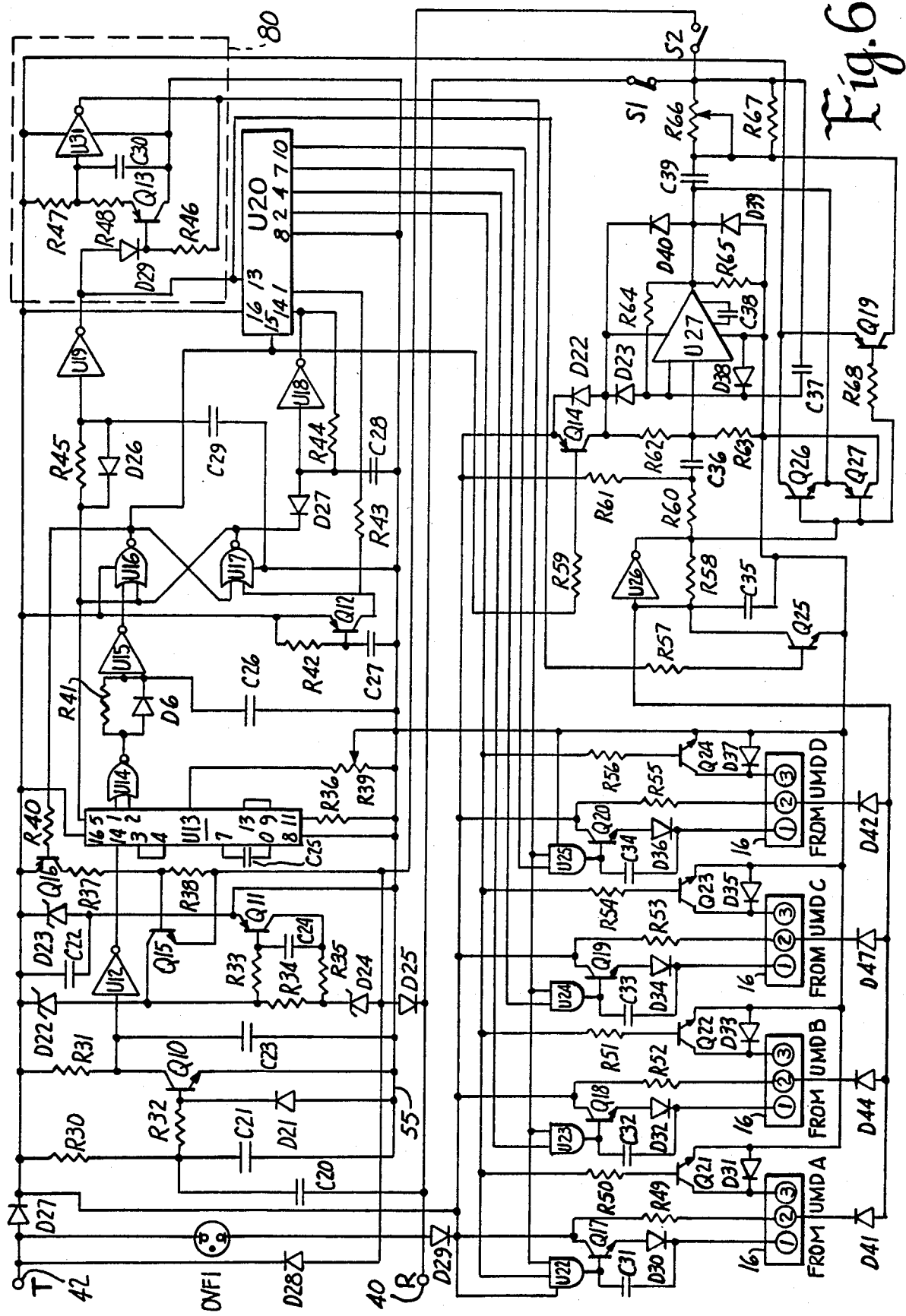
FIG. 6 is an electrical schematic diagram of a four monitoring device embodiment of the present invention; and, FIGS. 7A–D constitute is an electrical schematic diagram of an alternate embodiment of the present invention which provides customer identification and improved compensation for line conditions.
Figure 7A:
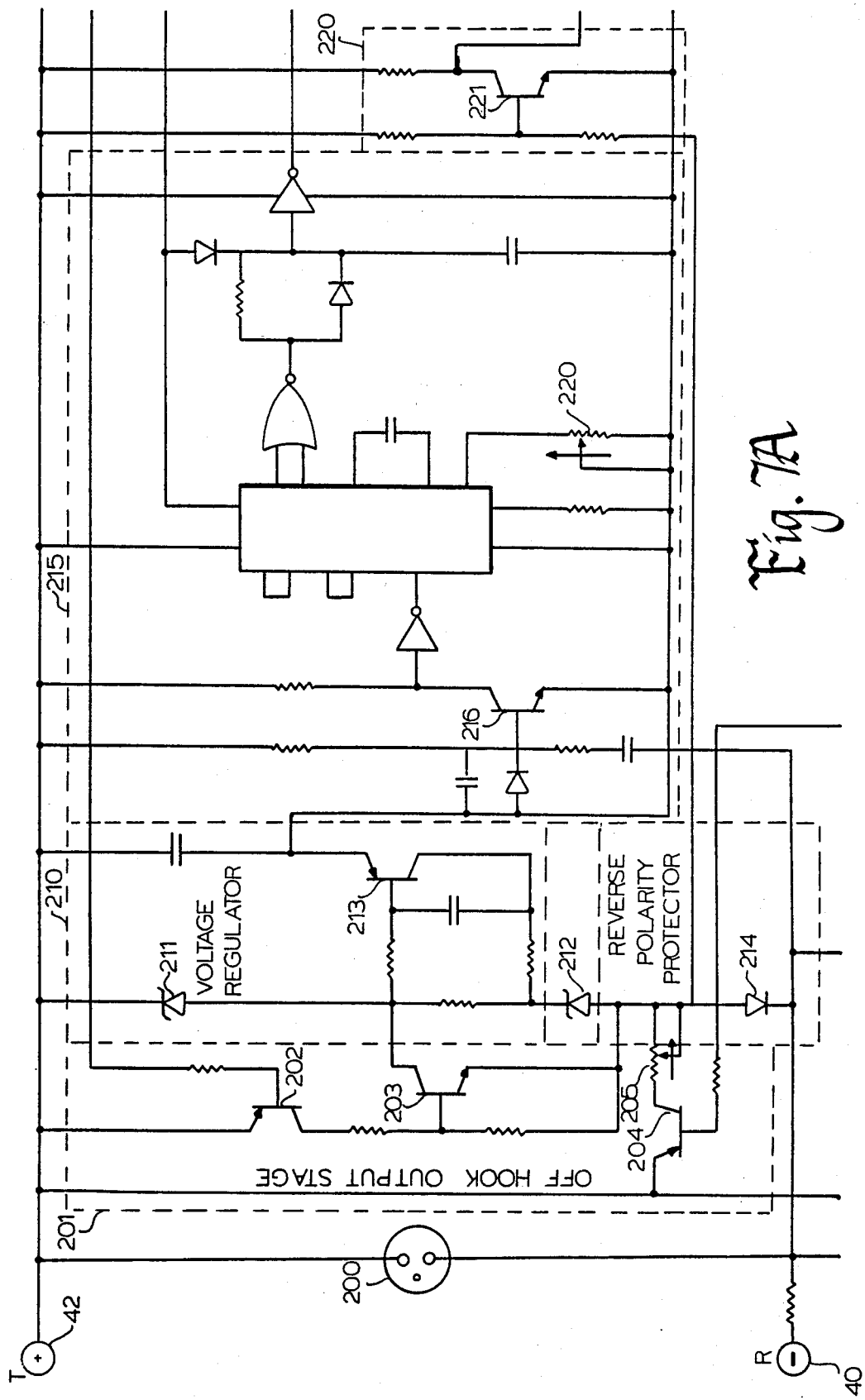
Figure 7B:
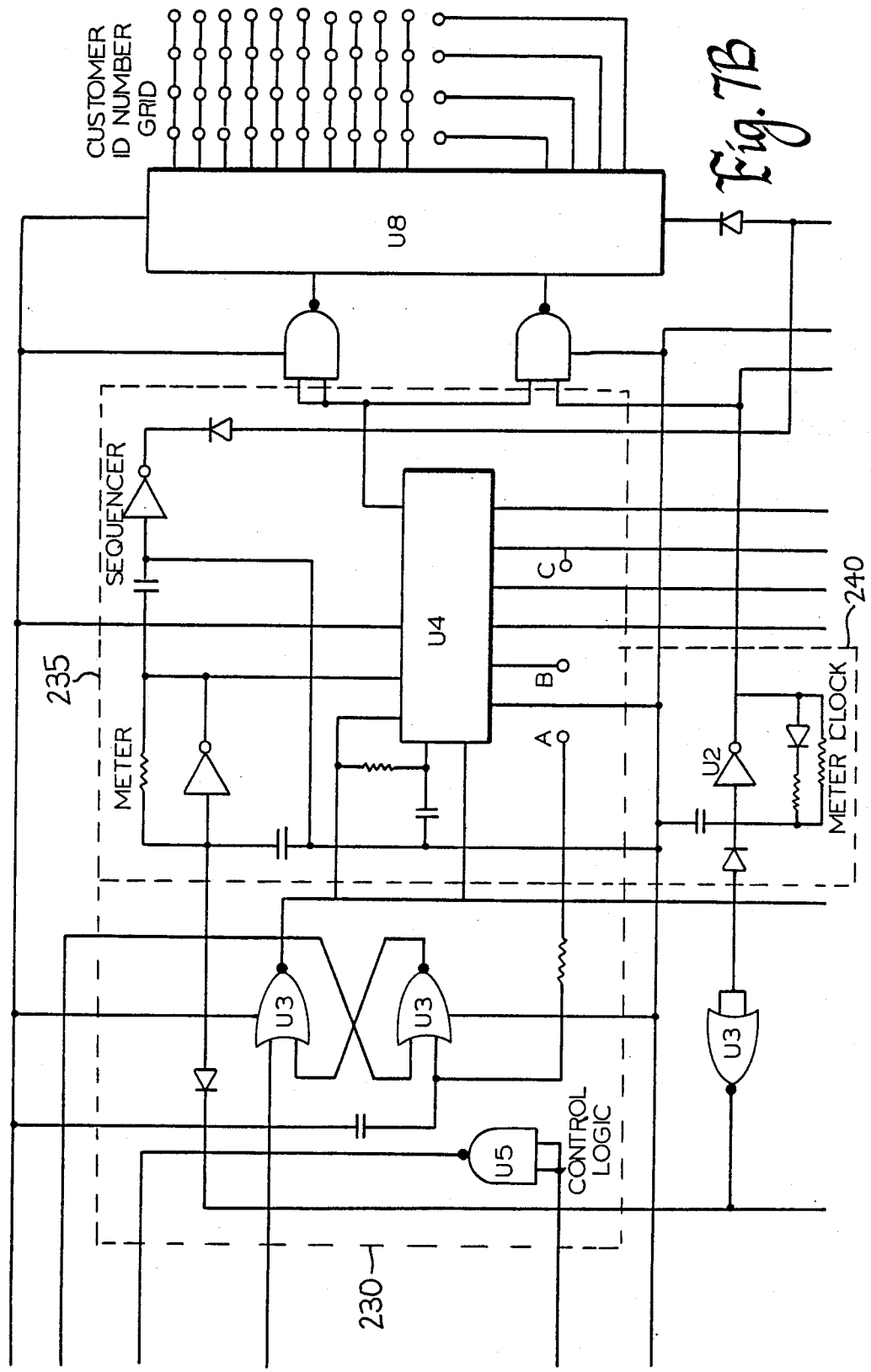
Figure 7C:
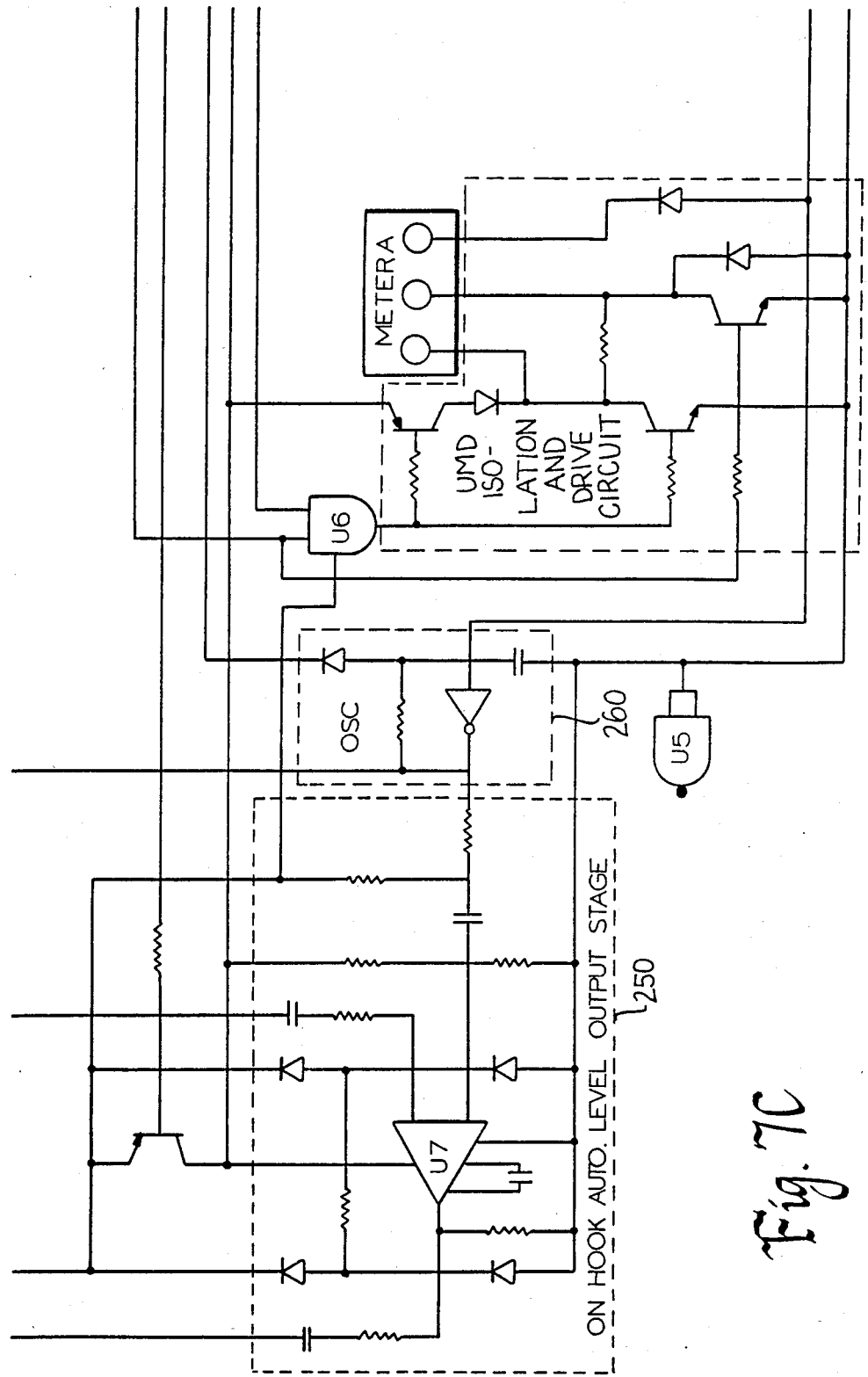
Figure 7D:
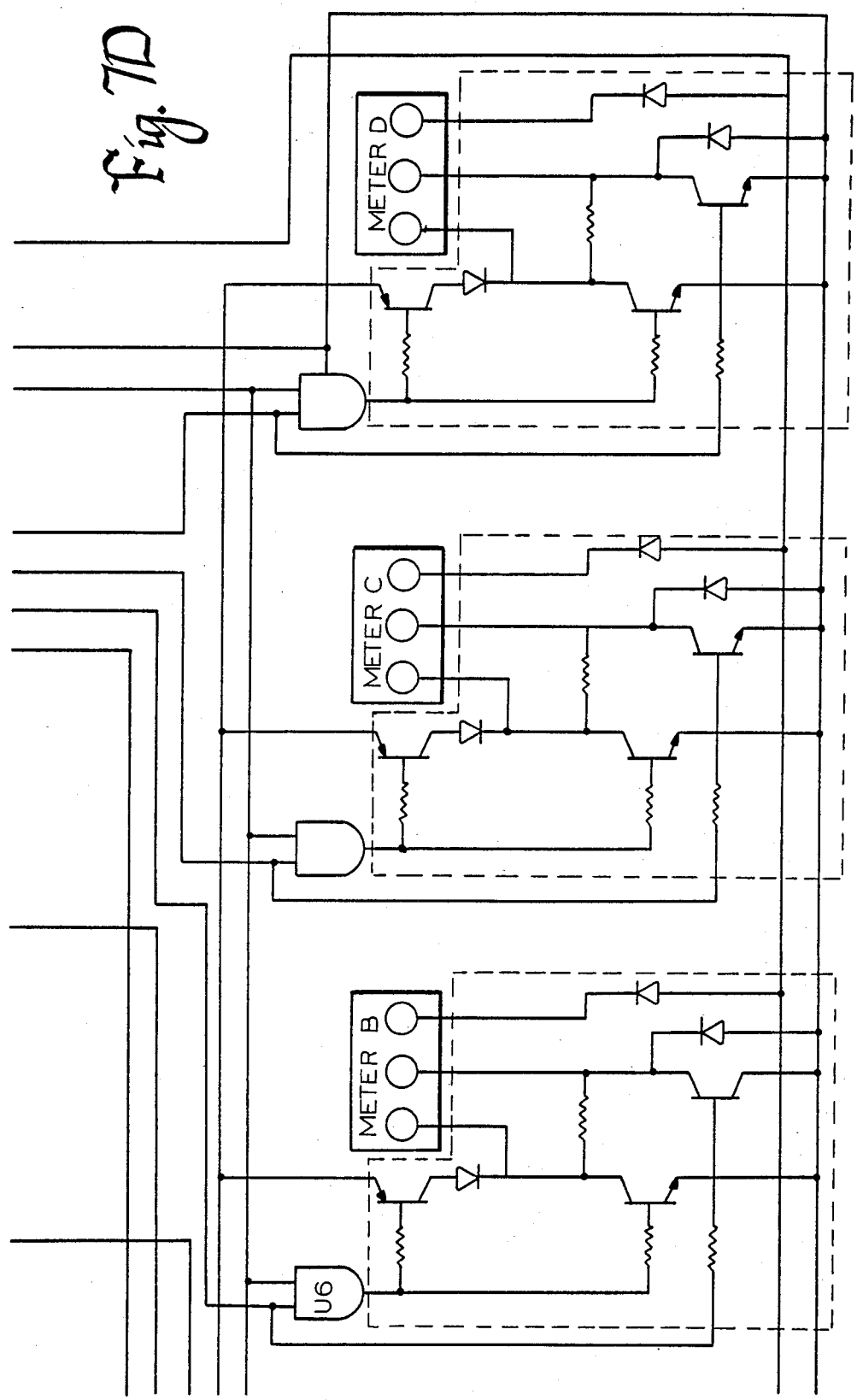

Referring now to FIG. 6, a four monitoring device embodiment of the MID 14 is seen. The circuitry of the four UMD embodiment allows for sequential sending of utility information from four separate UMD's 16, namely, UMD A, UMD B, UMD C and UMD D. The circuit of FIG. 6 shows interfacing for four Kullman water meter UMD's 16, each Kullman water meter of the type described in U.S. Pat. No. 4,085,287. It is, however, totally consistent with the applicant's invention to have a watthour meter, a gas meter, a Kullman water meter or other UMD 16 connected to the MID 14 to transmit utility usage information over the telephone line 12. The embodiment of FIG. 6 is basically the circuit of FIG. 3 with the capability of transmitting data from four meters in sequence from one subscriber station.

Again, as described in the single monitoring device embodiment of FIG. 3, two resistors R34 and R35 prevent the UMD 16 or MID 14 from interrupting telephone service which would be caused by shorts developing in either of the UMD 16 or MID 14. In the situation of a dead short in the MID 14, the telephone line 12 will only see resistors 34 and 35 in parallel or approximately 5.1 kilohms across its tip and ring connectors.

The S1 and S2 switches are option straps which enable a choice of three different output stages: (1) normal manual adjustment, (2) auto adjustment, and (3) OFF-HOOK (subscriber carrier output current loop stage, Q19).

Customer Identification Embodiment

I have found that certain conditions can exist in a telephone system when the identity of the line being interrogated can be lost and an ambiguity exist if two meters in sequence have identical readings. To absolutely avoid that possibility, I have developed a MID which encodes each customer with a unique 6 digit code. The code is transmitted with each data reading for processing at the telephone central office.

The customer encoding MID is shown in FIG. 7 connected to the tip and ring connectors 42 and 40, respectively of a telephone line. It includes a protector 200 similar to earlier embodiments and an optional OFF HOOK TRANSMIT STAGE 201 which allows the MID to transmit a reading even when the receiver is off hook, if interrogated. This stage which is ahead of the normal voltage regulator 210 and includes transistors 202, 203, 204 and adjustable resistance 205.

The voltage regulator or power supply for the MID, similar to earlier embodiments includes Zener diodes 211 and 212 and transistor 213. Reverse polarity protection is provided by diode 214.

The interrogation tone detector 215, similar to earlier embodiments senses the presence of an interrogation signal on the line to enable the transmission of meter readings. An off hook detector 220 including transistor 221 which allows the MID to be used on lines including party lines with high voltage off hook conditions.

The control logic section 230 includes NOR gates U3 and NAND gate U5. Meter read sequencing is provided by meter sequencer 335 comprising basically integrated circuit U4, preferably a type MC140 7.

Customer identification and signalling is accomplished due to the presence of U8 and a series of six ten position thumb wheel or equivalent switches capable of providing six digit numbers for encoding similar to data. For purpose of simplicity of explanation, the switches are shown as a six by four line matrix with the switches binary encoding the six lines with a four bit code.

The customer encoding MID also incudes its own meter clock circuit 240 to control the baud rate; on-hook automatic level output stage 250; its carrier oscillator 260 and individual UMD drive and isolation circuitry, the last, individual for each meter A-D.

Employing this embodiment, the customer identification number is encoded, similar to data but as six digits followed by a pause and then the four meter readings in sequence.

The above described embodiments of the applicant's invention are merely descriptive of its principles and are not to be considered limiting. The scope of this invention instead shall be determined from the scope of the following claims, including their equivalents.

I claim:

1. An interface device connectable in parallel with a telephone subset and to a source of utility usage information associated with the location of the telephone subset for sending utility usage information over a telephone line comprising:

converting means coupled to at least one utility monitoring device and to the telephone line for converting utility usage information from at least one utility monitoring device into alternating current representations and for sending the alternating current representation over the telephone line;

means coupled to the telephone line for detecting a preselected interrogation signal from the telephone line;

means for detecting an OFF-HOOK condition on the telephone line;

said last means responsive to an OFF-HOOK condition for disabling said interface device from responding to interrogation signals;

each of said means being powered by ON-HOOK current on said telephone line when in an idle line condition;

said interface device being operationally responsive to interrogation signals only of a voltage higher than the OFF-HOOK voltage at the telephone subset.

2. The interface device in accordance with claim 1 in which the interface device includes:

means for electrically isolating the utility monitoring device from the telephone lines such that electrical leakage paths within the utility monitoring device to a ground are prevented from electrically connecting to the telephone line;

said isolating means comprising voltage regulator means which references the interface device at or near ground potential of said telephone line;

said isolating means including at least one voltage reference diode connected across the telephone line, means effectively open circuiting said utility monitoring device, and at least one resistance means of predetermined value providing in the order of 5000 ohms in series with the telephone line in the event of a short circuit of said converting means of the source of utility usage information.

3. The interface device in accordance with claim 2 in which the enabling means comprises:

means for producing a monitor signal responsive to the detection of the interrogation signal; and, means for enabling the means for sensing the utility usage information for at least one utility monitoring device, responsive to the monitor signal.

4. The interface device in accordance with claim 1 in which the powering of each of said means comprises a voltage control means for converting telephone line voltage into another voltage appropriate for powering each of said other means, the voltage control means responsive to idle line current on said telephone line to power each of said means and drawing current less that that necessary to cause the ON-HOOK telephone line to switch to the OFF-HOOK condition.

5. The interface device in accordance with claim 1 in which the means for converting is operative to convert the utility usage information from each of the utility monitoring devices into the alternating current representations producing alternating current representations which comprise a series of ON-OFF carrier switched pulse width modulated pulses of audio frequency signals.

6. The interface device in accordance with claim 1 further including means for mounting the interface device inside a telephone line protector block including the tip and ring electrical terminator connectors;
   said interface device mounted on a printed circuit board including openings therethrough for receiving tip and ring connector terminals and are thereby available for direct electrical connection thereto.

7. The interface device in accordance with claim 1 further including resistance means connected across the telephone line for preventing interruption of the telephone line operation if the interface develops a short circuit condition;
   said interruption prevention means including a resistance network in series with said telephone line providing in the order of at least 5000 ohms resistance across the telephone line in the event of short circuit condition.

8. A method of sending utility usage information from at least one utility monitoring device over a telephone line comprising the steps of:
   monitoring the telephone line when in an ON-HOOK condition for a preselected speech frequency interrogation signal;
   detecting a preselected interrogation signal from the telephone line;
   sensing the utility usage information from at least one utility monitoring device;
   converting the sensed utility usage information into alternating current representations;
   sending the alternating current representations over the telephone line; and
   enabling the sensing, converting and sending steps responsive to the detection of the preselected interrogation signal from the power supplied over the ON-HOOK condition telephone line totally by powering each of said steps solely by idle line ON-HOOK current on the telephone line.

9. The method of sending utility usage information over a telephone line in accordance with claim 8 in which the step of converting the sensed utility usage information into alternating current representations comprises the steps of:
   providing digitally encoded representations of the sensed utility usage information from each of the utility monitoring devices; and,
   converting the digitally encoded representations of the utility usage information from each of the utility monitoring devices into the alternating current ON-OFF carrier switched pulse width modulation representations.

10. The method of sending utility usage information in accordance with claim 9 in which the step of converting the utility usage information into alternating current representations sends alternating current representations comprising a series of pulses of an ON-OFF carrier switched pulse width modulated single audio frequencytone within the voice bandwidth of the telephone line.

11. A meter interface unit for transmitting utility usage information via telephone lines for processing at said central office from a customer's location to a central office including a central office battery normally connected to said telephone lines when said lines are in an idle condition comprising:
   means coupled to a utility usage meter for detecting utility usage;
   means for converting the quantity of utility usage into a series of encoded pulses;
   means for encoding the identification of the customer's location as a series of encoded pulses; and
   means responsive to an interrogation signal received over the telephone lines for enabling the transmission of the customer identification and utility usage information to the central office;
   said detecting means, said converting means and said encoding means all powered over said telephone line with said telephone line by the central office battery when said telephone line is in an idle ON-HOOK condition.

12. Thecombination in accordance with claim 11 including means for combining the customer identification pulses and utility information into a train of ON-OFF carrier switched pulse width modulated pulses wherein said combining means is further powered over said telephone line.

* * * * *